United States Patent [19]
Durand

[11] 3,754,794
[45] Aug. 28, 1973

[54] PNEUMATIC ANTISKID BRAKING SYSTEM

[75] Inventor: Philippe Durand, Saint-Denis, France

[73] Assignee: Societe Anonyme D.B.A., Paris, France

[22] Filed: Dec. 8, 1971

[21] Appl. No.: 205,851

[30] Foreign Application Priority Data
Dec. 11, 1970  France .............................. 7044703

[52] U.S. Cl. .......................... 303/21 F, 188/181 R
[51] Int. Cl. ............................................... B60t 8/06
[58] Field of Search ...................... 303/21 F, 21 AF, 303/61–63, 68–69; 188/181

[56] References Cited
UNITED STATES PATENTS
3,536,362  10/1970  Davis ................................. 303/21 F
3,633,978  1/1972  Remillieux ......................... 303/21 F Primary Examiner—Milton Buchler
Assistant Examiner—D. C. Butler
Attorney—Ken C. Decker

[57] ABSTRACT

The invention relates to a pneumatic antiskid braking system for vehicles equipped with pneumatic power assistance.

An exhaust valve designed to connect the motor chamber of a brake motor to the atmosphere is controlled on the one hand by a piston submitted to motor pressure differential between the two opposite chambers of the brake motor, and on the other hand by a control submitted to the opposed efforts provided by a preloaded spring and by a pilot pressure controlled by a valve operatively actuated by the antiskid control unit.

3 Claims, 1 Drawing Figure

Patented Aug. 28, 1973 3,754,794
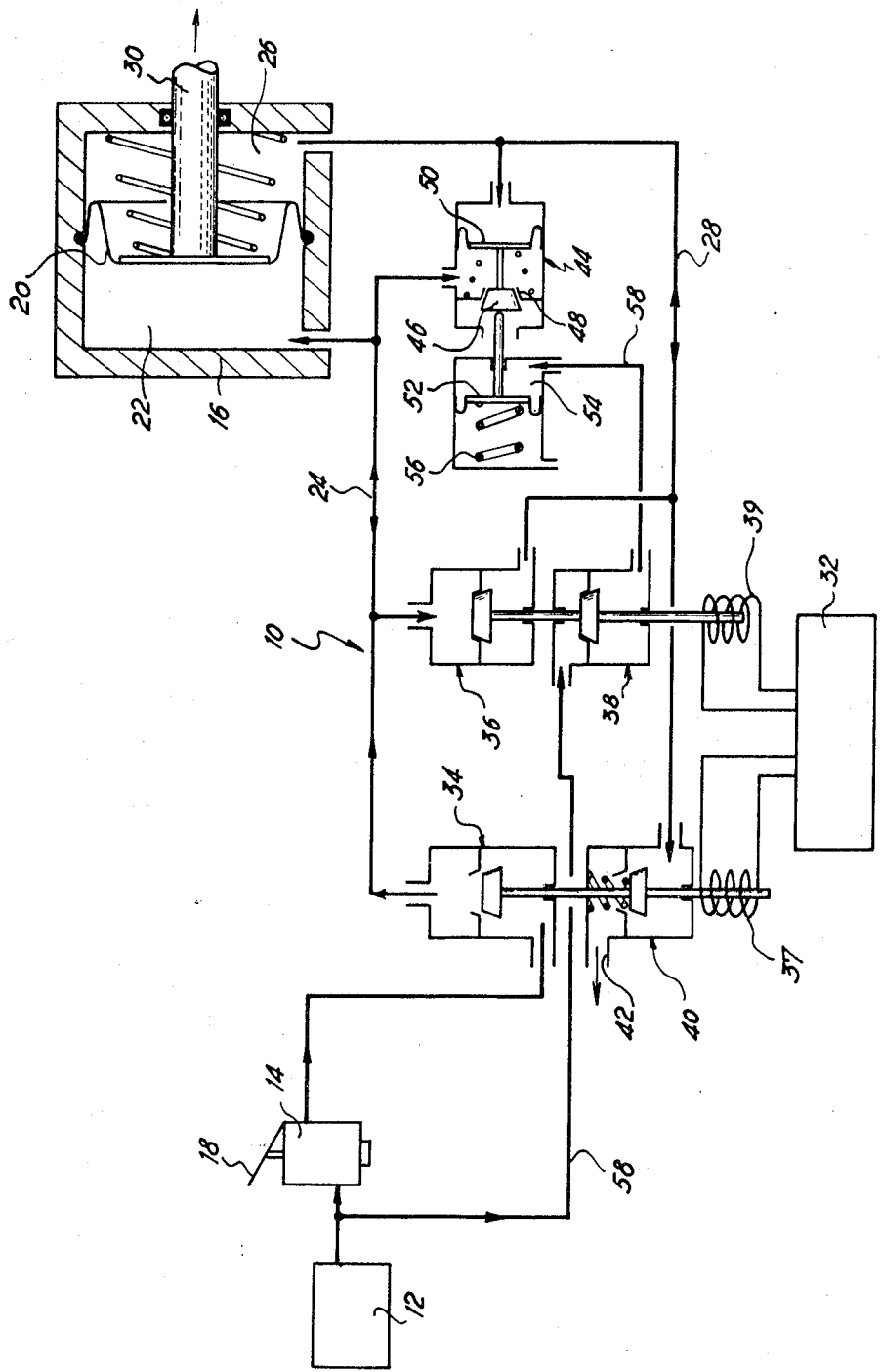

PNEUMATIC ANTISKID BRAKING SYSTEM

The invention substantially relates to a pneumatic anti-skid braking system for a vehicle equipped with a pneumatic power assistance.

More particularly the invention provides an improvement in a pneumatic anti-skid braking system of the type comprising a normally open inlet valve adapted to control the fluid connection between a variable pneumatic braking pressure source and the variable volume motor chamber of a brake actuator controlling the braking operation of at least one of the vehicle wheels, a normally open least outlet valve adapted to control the fluid connection between the variable volume exhaust chamber of said brake actuator opposite to said motor chamber and a relatively low fluid pressure reservoir, a first normally closed exhaust valve adapted to control the fluid connection between said motor and exhaust chambers of said brake actuators, which inlet, outlet and balancing valves are operatively connected to and actuated by an antiskid control unit responsive to the angular displacement of said braked vehicle wheel so as to modulate the differential pressure between said motor and exhaust chambers of said brake motors according to predetermined skidding conditions of said braked wheel, and a second normally closed exhaust valve adapted to control the fluid connection between said motor chamber and said reservoir, said second exhaust valve being operatively connected to and actuated by a piston responsive to said differential pressure between said motor and exhaust chambers so as to connect said motor chamber to said reservoir whenever the pressure level in said exhaust chamber exceeds the pressure level in said motor chamber by a predetermined value. Such an antiskid braking is known from the subject matter disclosed and claimed in the U.S. Pat. No. 3,633,978 to which the subject matter of this application is related.

In such a system, because of the various losses of head which appear between the pressure source, the brake motor and the low pressure reservoir, the principle of controlling the second exhaust valve by said pneumatic differential pressure brings in the following drawbacks:

Upon action of the antiskid control unit, the second exhaust valve between the motor chamber and the low pressure reservoir is opened. After this action, this exhaust valve has a tendency to not return immediately to its closed position, when the motor chamber is still connected to the pressure bracking source through the intermediate of the inlet valve. Then, during this time, the pressure braking source is directly connected to the low pressure reservoir, and of course an abnormal consumption of pneumatic power assistance fluid is generated ( vacuum and/or pressure.). In order to overcome the above drawback, the present invention provides an improvement in the braking system hereinabove described, in which said second exhaust valve is further operatively connected to control means actuated by said antiskid control unit so as to be maintained in its normally closed position whenever said inlet, outlet and balancing valves are not actuated away from their respective normal positions.

According to another feature of the invention, said control means includes a secondary piston responsive to a control pressure controlled from a fluid pressure source by a control valve operatively actuated by said antiskid control unit.

The invention will now be described with reference to the accompanying drawing, in which the sole FIGURE is a schematic diagram of a pneumatic antiskid braking system according to the invention.

In the sole FIGURE of the drawing, the reference numeral 10 generally designates a pneumatic braking system which substantially comprises a compressed air reservoir 12, a pressure control valve 14 and a pneumatic brake motor 16. The reservoir 12 is designed to be supplied with fluid under pressure an air compressor (not shown) driven by the vehicle engine so as to deliver a fairly high and substantially constant air pressure to the inlet of the control valve 14. The valve 14 is of a classic type and is designed to control a variable pneumatic braking pressure, communicated to the brake motor 16, as a function of the control by the vehicle driver of the valve control element 18. The brake motor 16 is of a classic type and comprises a moving element forming a piston such as a membrane 20 defining within the motor 16 a motor chamber 22 which is normally connected to the outlet of th control valve 14 by means of a supply pipe 24, and an evacuation of return chamber 26 opposite the motor chamber 22, which is normally connected to an evacuation pipe 28. The moving element forming a piston 20 is connected to a thrust rod which can be directly connected to the mechanical inlet control element (not shown) of a set of wheel brakes (not shown), or which may also be associated with a hydraulic mater cylinder (not shown) controlling the hydraulic braking pressure communicated to a set of wheel cylinders (not shown).

The pneumatic differential pressure acting on the piston 20 is further controlled by a normally open inlet valve 34 controlling the fluid flow in the pipe 24 between the outlet of the control valve 14 and the motor chamber 22 by a normally open outlet valve 40 controlling the fluid flow in the piep 28 between the evacuation chamber 26 and an outlet port 42 connected to a relatively low pressure reservoir such as the atmosphere, and by a first normally closed exhaust valve 36 controlling the communication between the pipes 24 and 28. In the illustrated example, the valves 34 and 40 are rigidly locked with one another, and are elctromagnetically actuated towards their respective closed positions by a coil 37, when the exhaust valve 36 is actuated towards its open position by another coil 39.

The braking system 10 is equipped with an electric antiskid control unit of any suitable known type which is responsive to angular displacement of the braked wheel or wheels corresponding to the brake motor 16, and is designed so as to control the energization of the coils 37 and 39 and to modulate the pressure differential between the opposite chambers 12 and 26 of the brake motor 16, by means of the valves 34, 36 and 40, so as to prevent any locking of said braked wheels, as it is well known by those skilled in the art. (See for example U.S. Pat. No. 3,633,978.)

In order to increase the speed of response and accessorily to cancel the braking effort, in view of the fact that the piston 20 is a differential one, there has been provided to connect chamber 22 to a reservoir at a low pressure such as the atmosphere through the intermediate of a second exhaust valve 44 which is normally closed when the pressure differential defined above is lower than a given value. More particularly, valve 44 comprises a valve member 46 adapted to sealingly engage a seat 48, said valve member being connected to a piston 50 submitted to said pressure differential between the two chambers 22 and 26.

However, upon action of an antiskid control unit 32 which causes in a first step the closing of valves 34 and 40, and in a second step the opening of valve 36, the pressure in chamber 26 rises to reach a value which is above the atmospheric pressure, since when exhaust vavle 36 is opened, pipe 24 is communicated with pipe 28, thereby communicating exhaust chamber 26 with motor chamber 22. Supposing that valve 44 is then urged towards its open position and that control unit 32 subsequently allows valves 34, 36 and 40 to return to their normal positions respectively as shown in the drawing, it will be easily understood that the various losses of head between source 14 and chamber 22 and the atmosphere on the one hand, and between chamber 26 and the low pressure reservoir (atmosphere) on the other hand, introduce a substantial time delay in the decreasing of the residual pressure differential which thus further urges valve 44 towards its opening position. During this time delay, the control valve is directly connected to the reservoir (atmosphere) which results in a substantial loss of air pressure power assistance on the one hand, and a longer time of response on brake 16 on the other hand.

To overcome this drawback, the invention provides controlling the valve member 46 of valve 44 by movable control means 52 slidably and sealingly movable in a chamber 54 and normally urged by a compression spring 56 in engagement against the valve member 46 to urge the latter towards its seat 48. Chamber 54 is connected to a pressure source such as source 12 by a pipe 58 controlled by a pilot valve 38, the latter being controlled by the antiskid control unit 32. In the represented embodiment, the pilot valve 38 is made solid with the valve 36.

It will be understood that with the above described improvement, the displacement of the movable control means constituted by control piston 52 and consequently the opening of valve member 46 is directly controlled by the antiskid control unit 32 which avoids the aforesaid time delays in the closing of the valve 44.

I claim:

1. A pneumatic antiskid vehicle braking system comprising a normally open inlet valve adapted to control the fluid connection between a variable pneumatic braking pressure source and the variable volume motor chamber of a brake actuator controlling the braking operation of at least one of the vehicle wheels, a normally open outlet valve adapted to control the fluid connection between the variable volume exhaust chamber of said brake actuator opposite to said motor chamber and a relatively low fluid pressure reservoir, a first normally closed exhaust valve adapted to control the fluid connection between said motor and exhaust chambers of said brake actuators, which inlet, outlet and first exhaust valves are operatively connected to and actuated by an antiskid control unit responsive to the angular displacement of said braked vehicle wheel so as to modulate the differential pressure between said motor and exhaust chambers of said brake motors according to predetermined skidding conditions of said braked wheel, and a second normally closed exhaust valve adapted to control the fluid connection between said motor chamber and said reservoir, said second exhaust valve being operatively connected to and actuated by a piston responsive to said differential pressure between said motor and exhaust chambers so as to connect said motor chamber to said reservoir whenever the pressure level in said exhaust chamber exceeds the pressure level in said motor chamber by a predetermined value, characterized in that said exhaust valve is further operatively connected to control means actuated by said antiskid control unit so as to be maintained in its normally closed position whenever said inlet, outlet and first exhaust valves are not actuated away from their respective normal positions.

2. A pneumatic antiskid vehicle braking system according to claim 1, characterized in that said control means includes a secondary piston responsive to a control pressure controlled from a fluid pressure source by a control valve operatively actuated by said antiskid control unit.

3. A pneumatic antiskid vehicle braking system accodding the claim 2, characterized in that said control pressure acts on said secondary piston against the return force of preloaded resilient means normally urging said exhaust valve in its normally closed position.

* * * * *